United States Patent
Li

(10) Patent No.: US 9,305,519 B2
(45) Date of Patent: Apr. 5, 2016

(54) IMAGE COLOR ADJUSTING METHOD AND ELECTRONIC DEVICE USING THE SAME

(71) Applicant: Shan Li, Taipei (TW)

(72) Inventor: Shan Li, Taipei (TW)

(73) Assignee: ASUSTeK COMPUTER INC., Taipei (TW)

(*) Notice: Subject to any disclaimer, the term of this patent is extended or adjusted under 35 U.S.C. 154(b) by 47 days.

(21) Appl. No.: 14/272,511

(22) Filed: May 8, 2014

(65) Prior Publication Data

US 2014/0333654 A1 Nov. 13, 2014

Related U.S. Application Data

(60) Provisional application No. 61/821,237, filed on May 9, 2013.

(30) Foreign Application Priority Data

Jan. 24, 2014 (TW) .............................. 103102712 A

(51) Int. Cl.
*G09G 5/02* (2006.01)
*G06T 11/00* (2006.01)

(52) U.S. Cl.
CPC ................ *G09G 5/02* (2013.01); *G06T 11/001* (2013.01); *G09G 2340/06* (2013.01)

(58) Field of Classification Search
CPC ........... H04N 1/628; H04N 1/60; H04N 9/73; H04N 9/3182; G09G 5/02; G09G 2320/0666; G09G 2340/06; G09G 3/2003; G09G 2360/16; G06T 2207/10024; G06T 7/408; G06T 11/00; G06T 2207/30088; G06T 2207/30196
See application file for complete search history.

(56) References Cited

U.S. PATENT DOCUMENTS

| | | | |
|---|---|---|---|
| 8,265,410 B1 | 9/2012 | Konoplev | |
| 8,319,790 B2 | 11/2012 | Ho et al. | |
| 8,446,485 B2 | 5/2013 | Matsumoto et al. | |
| 2002/0193956 A1* | 12/2002 | Van de Capelle et al. | ...... 702/81 |
| 2004/0156544 A1 | 8/2004 | Kajihara | |
| 2006/0146348 A1 | 7/2006 | Kress | |

(Continued)

FOREIGN PATENT DOCUMENTS

| | | |
|---|---|---|
| CN | 101115211 | 1/2008 |
| CN | 101141653 | 3/2008 |

(Continued)

OTHER PUBLICATIONS

"Office Action of European Counterpart Application", issued on Oct. 6, 2014, p. 1-p. 6.

*Primary Examiner* — Jeffrey Chow

(74) *Attorney, Agent, or Firm* — Jianq Chyun IP Office

(57) ABSTRACT

An image color adjusting method and an electronic device thereof are provided. The image color adjusting method includes following steps: obtaining multiple groups of first pixel data of an image in a first color space, and performing a color space transforming process for the first pixel data to obtain multiple groups of second pixel data of the image in a CIELAB color space, wherein each of the second pixel data includes a luminance component L*, a first color component a* and a second color component b*; adjusting the first color component and the second color component of the second pixel data to obtain multiple groups of third pixel data, and performing a color space transforming process for the third pixel data to obtain multiple groups of fourth pixel data corresponding to the third pixel data in the first color space.

12 Claims, 3 Drawing Sheets

(56) References Cited

U.S. PATENT DOCUMENTS

| | | |
|---|---|---|
| 2006/0222242 A1 | 10/2006 | Hayaishi |
| 2008/0079968 A1 | 4/2008 | Ho et al. |
| 2009/0060326 A1 | 3/2009 | Imai et al. |
| 2009/0196475 A1* | 8/2009 | Demirli et al. ............... 382/128 |
| 2011/0019029 A1 | 1/2011 | Matsumoto et al. |
| 2011/0299143 A1* | 12/2011 | Alessi et al. ................ 358/504 |
| 2013/0044122 A1 | 2/2013 | Ho et al. |
| 2013/0208994 A1* | 8/2013 | Shirata ......................... 382/254 |
| 2013/0321700 A1* | 12/2013 | Cote et al. .................... 348/453 |
| 2015/0016687 A1* | 1/2015 | Wang et al. .................. 382/103 |

FOREIGN PATENT DOCUMENTS

| | | |
|---|---|---|
| CN | 102496144 | 6/2012 |
| JP | 2003011868 | 1/2003 |
| JP | 2003110868 | 4/2003 |
| JP | 2004192614 | 7/2004 |
| JP | 2006261879 | 9/2006 |
| TW | 200737996 | 10/2007 |
| TW | 200737998 | 10/2007 |
| TW | 200816827 | 4/2008 |
| TW | 201112754 | 4/2011 |

* cited by examiner

IMAGE COLOR ADJUSTING METHOD AND
ELECTRONIC DEVICE USING THE SAME

CROSS-REFERENCE TO RELATED
APPLICATION

This application claims the priority benefits of U.S. provisional application Ser. No. 61/821,237, filed on May 9, 2013, and Taiwan application serial No. 103102712, filed on Jan. 24, 2014. The entirety of each of the above-mentioned patent applications is hereby incorporated by references herein and made a part of specification.

BACKGROUND OF THE INVENTION

1. Field of the Invention

The invention relates to an image processing method, more particularly, to an image color adjusting method for an electronic device.

2. Description of the Related Art

As display technology develops, various electronic devices equip with an image displaying function for revealing information. A user can select an appropriate electronic device to display images according to locations, occasions or time points. For example, a handheld device, such as a tablet computer, or a home appliance, such as a television, can be used to display desire images. It is known that different electronic devices has different image qualities, therefore, various image processing methods are proposed and applied to different devices in order to get high-quality and bright-colored images.

In pursuit of high-quality images, the user can obtain bright-colored and clear images by improving the color saturation. For example, when a plurality of pixel data of the image is defined in an RGB color space, the color saturation of the image can be adjusted by adjusting a red component, a green component or a blue component of the pixel data. However, if a single color component of the image is directly adjusted or improved in the RGB color space, the image may distort, and the color may become too bright which results in a false contour effect.

BRIEF SUMMARY OF THE INVENTION

An image color adjusting method to improve the color saturation by adjusting the color of an image in a specific color space to is provided.

An electronic device using the present disclosure method is also provided herein. After the electronic device receives pixel data of an image, it performs a color space transforming process for the pixel data via an image processing unit, and executes a color adjusting for the pixel data in the specific color space to improve and display the image in high quality.

An image color adjusting method applied to an electronic device equips an image processing function is also disclosed herein. The image color adjusting method adjusts the color of an image. The image color adjusting method includes following steps: obtaining multiple groups of first pixel data of an image in a first color space; performing a color space transforming process for the first pixel data to obtain multiple groups of second pixel data of the image in a CIELAB color space, wherein each of the second pixel data includes a luminance component L*, a first color component a* and a second color component b*; adjusting the first color component and the second color component of the second pixel data to obtain multiple groups of third pixel data, and performing a color space transforming process for the third pixel data to obtain multiple groups of fourth pixel data corresponding to the third pixel data in the first color space.

An electronic device equips an image processing function and can adjust the color of an image. The electronic device includes an image receiving unit, an image processing unit and a display screen. The image receiving unit receives an image and obtains multiple groups of first pixel data of the image in a first color space. The image processing unit is coupled to the image receiving unit and performs a color space transforming process for the first pixel data to obtain multiple groups of second pixel data of the image in a CIELAB color space. Each of the second pixel data includes a luminance component L*, a first color component a* and a second color component b*. The image processing unit applies a color adjusting model to adjust the first color component a* and the second color component b* of the second pixel data to obtain multiple groups of third pixel data, and the image processing unit performs a color space transforming process for the third pixel data to obtain multiple groups of fourth pixel data corresponding to the third pixel data in the first color space. The display screen is coupled to the image processing unit to receive and display the image including the fourth pixel data.

As stated above, in the image color adjusting method and the electronic device using the method, the pixel data of the image in other color spaces are transformed to the CIELAB color space and the color is adjusted. In the image color adjusting method, the first color component and the second color component of the pixel data in the CIELAB color space are further adjusted via the color adjusting model, so as to improve the color saturation of the image, and the adjusted pixel data are transformed back to the original color space for outputting and displaying. Consequently, the color saturation of the image is improved to make the image color brighter, and the image distortion can be avoided.

These and other features, aspects and advantages of the present invention will become better understood with regard to the following description, appended claims, and accompanying drawings.

DETAILED DESCRIPTION OF THE
EMBODIMENTS

An image color adjusting method and an electronic device are illustrated with relating figures. The same symbols denote the same elements or components.

The image color adjusting method is applied to an electronic device equips with an image processing function for image color adjusting. Conventionally, an image includes a plurality of pixels, and thus image data include multiple groups of pixel data defined in a color space. In the image color adjusting method, a color space transforming process is performed for the pixel data, so the color of the image can be adjusted in a CIELAB color space via a color adjusting model, and the image distortion can be avoided.

Figure 1:
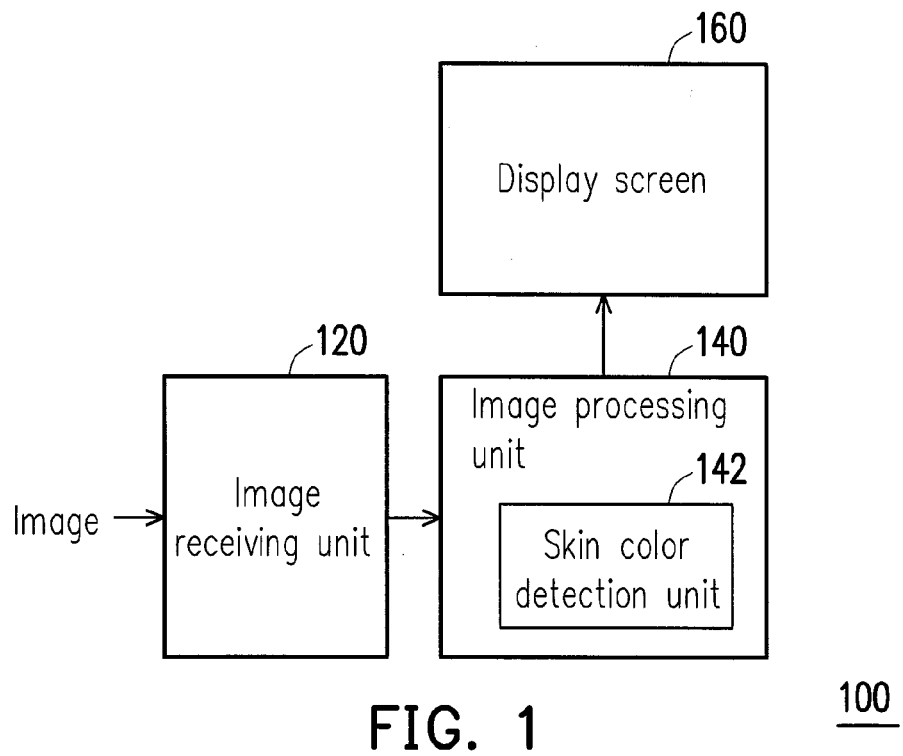
FIG. 1 is a block diagram showing an electronic device in an embodiment.

FIG. 1 is a block diagram showing an electronic device in an embodiment. Please refer to FIG. 1, the electronic device 100 includes an image receiving unit 120, an image processing unit 140 and a display screen 160. The electronic device 100 equips with an image processing function to adjust the color of the image. In detail, the image receiving unit 120 receives an image from an external device, and transfers multiple groups of pixel data of the image to the image processing unit 140. The image processing unit 140 is coupled to the image receiving unit 120, receives and processes the image. The processed image is outputted to the display screen 160 and displayed by the display screen 160. The display screen 160 may be a liquid crystal display (LCD) or a light-emitting diode (LED) display, which is not limited herein.

Figure 2:
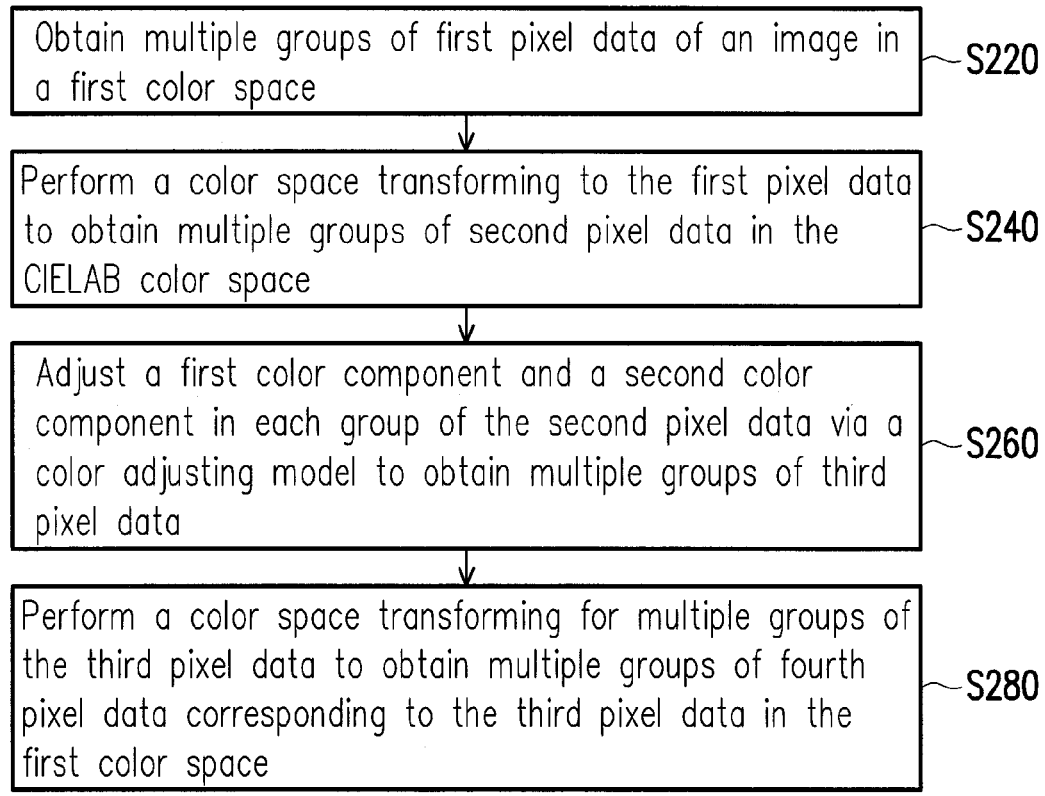
FIG. 2 is a flow chart showing an image color adjusting method in an embodiment.

FIG. 2 is a flow chart showing an image color adjusting method in an embodiment. Please refer to FIG. 1 and FIG. 2, the image color adjusting method includes following steps. In step S220, the image receiving unit 120 obtains multiple groups of first pixel data of the image in a first color space. In the embodiment, the first color space is an RGB color space, and each group of the first pixel data includes a red component, a green component and a blue component, respectively. The first color space may be other types of color space, such as a CMYK color space, which is not limited herein.

In step S240, the image processing unit 140 receives multiple groups of the first pixel data, and performs a color space transforming process for the first pixel data to obtain multiple groups of second pixel data in the CIELAB color space. In the CIELAB color space, the second pixel data includes a luminance component L*, a first color component a* and a second color component b*. In detail, the luminance component L* represents the luminance of a single pixel, the first color component a* represents a bias degree of the color of a single pixel between red and green (which are opponent colors), and the second color component b* represents a bias degree of the color of a single pixel between yellow and blue (which are opponent colors). Since the CIELAB color space is visually uniform, the color adjustment is executed in the CIELAB color space, and it can correctly correspond to the color change in visual.

In the embodiment, the first color space is the RGB color space. The pixel data in the RGB color space cannot be directly transformed to the pixel data in the CIELAB color space. Thus, a transitional color space, such as a CIEXYZ color space, is needed to help transforming the first pixel data in the RGB color space to the second pixel data in the CIELAB color space. In detail, a color space transforming process is performed for the first pixel data to obtain transitional pixel data in the transitional color space, wherein the transitional pixel is corresponding to the first pixel data. Then, the color space transforming process is performed for the transitional pixel data to obtain the second pixel data in the CIELAB color space, wherein the second pixel data is corresponding to the transitional pixel data.

In step S260, the image processing unit 140 adjusts the first color component a* and the second color component b* in each group of the second pixel data via a color adjusting model to obtain multiple groups of third pixel data. In the embodiment, the color adjusting model is:

$$g(x) = p \times \frac{f(x)^t}{f(x)^\gamma + q} \quad \text{formula (1)}$$

Wherein "x" represents the first color component a* or the second color component b*, "f(x)" is a color mapping value of the first color component a* or the second color component b* mapping to a range between "0" to "1", parameters "t" and "γ" are control parameters, parameters "p" and "q" are limit parameters, and "g(x)" is a color adjusting value which generated by adjusting the color mapping value "f(x)" via the color adjusting model. In the embodiment, it is better that the limit parameters "p" and "q" are integers.

Figure 4:
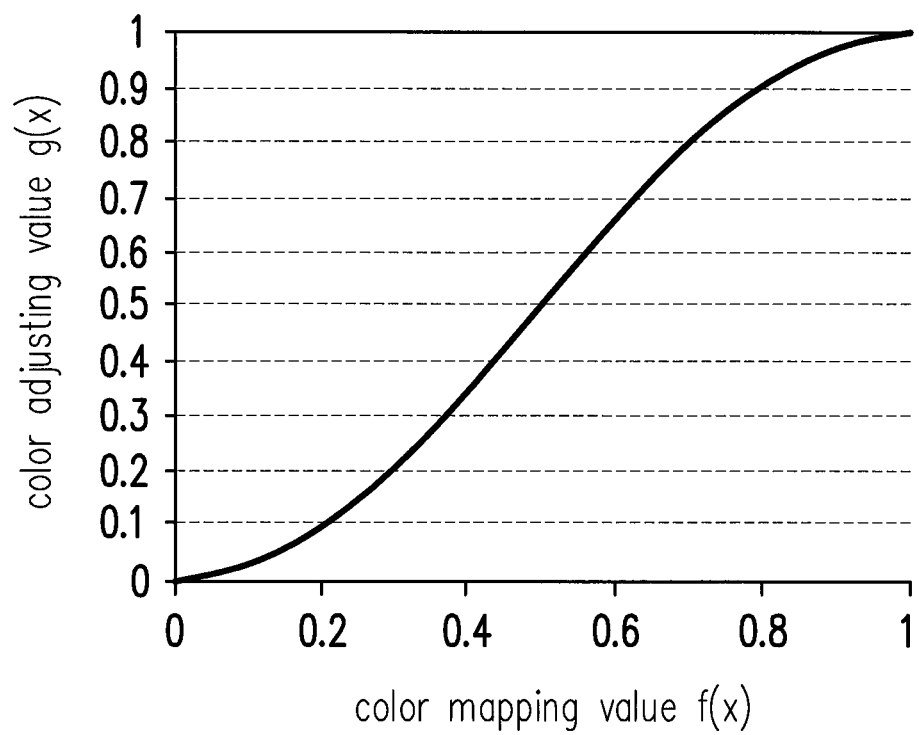
FIG. 4 is a schematic diagram showing a color adjusting model in an embodiment.

FIG. 4 is a schematic diagram showing the color adjusting model in an embodiment. Please refer to FIG. 4 and the color adjusting model (formula 1), the curve in FIG. 4 represents the corresponding relation between the color mapping value f(x) and the color adjusting value g(x) in the color adjusting model (formula 1). In other words, the curve in FIG. 4 represents the corresponding relation between the inputted first color component a*, the second color component b* and the outputted first color component a*, the second color component b*. When the first color component a* and the second color component b* of the second pixel data are adjusted via the color adjusting model (formula 1), the inputted first color component a* or the second color component b* is first mapped to a range between "0" to "1" to obtain the color mapping value f(x), and after the color adjustment, the color adjusting value g(x) is mapped back to the value range of the first color component a* or the second color component b* to obtain multiple groups of the third pixel data. The third pixel data also include a luminance component L*, a first color component a* and a second color component b*.

In the embodiment, the change of the first color component a* and the second color component b* can be adjusted correspondingly by adjusting the control parameters t, γ and the limit parameters p, q. The control parameters t and γ can determine an adjusting degree of the first color component a* and the second color component b*, and the limit parameters p and q can limit the first color component a* and the second color component b*, so as to avoid that the first color component a* and the second color component b* are increased too much and a color supersaturation occurs. In the embodiment, the control parameters "t" and "γ" preferably meet conditions of 0≤γ≤4 and 0.99≤t≤1.91, and the limit parameters "p" and "q" preferably meet conditions of 0<p≤2 and 0<q≤1.

In the CIELAB color space, the first color component a* represents a bias degree of the color of a single pixel between red and green (which are opponent colors), and the second color component b* represents a bias degree of the color of a single pixel between yellow and blue (which are opponent colors). Thus, in the relation shown in FIG. 4, if the inputted color mapping value f(x) is near "1", it represents that the first color component a* is reddish, or the second color component b* is yellowish. On the contrary, if the inputted color mapping value f(x) is near "0", it represents that the first color component a* is greenish, or the second color component b* is bluish. As shown in FIG. 4, the color adjusting model can adjust the bias degree of the color component between opponent colors. For example, if the inputted color mapping value f(x) is 0.8, after it is adjusted via the color adjusting model (formula 1), the outputted color adjusting value is 0.9. If "x" is the first color component a*, it represents that the first color component a* is reddish after adjustment, and if "x" is the second color component b*, it represents that the first color component b* is yellowish after adjustment.

In the CIELAB color space, the chromaticity C* is defined as follows:

$$C^* = \sqrt{(a^*)^2 + (b^*)^2} \quad \text{formula (2)}$$

The color saturation $S_{ab}$ is defined as follows:

$$S_{ab} = \frac{C^*}{L^*} \quad \text{formula (3)}$$

The first color component a* and the second color component b* in the CIELAB color space meet the conditions of −R≤a*≤R and −R≤b*≤R, and "R" is any integer. Since the color adjusting model (formula 1) can adjust the bias degree of the color component between opponent colors, for the image (or the pixels), the image processing unit 140 can relatively increase the chromaticity C* by adjusting the control parameters "t" and "γ", and can further improve the color saturation $S_{ab}$ without affecting the luminance L*.

Please refer to FIG. 1 and FIG. 2 again, in step S280, after multiple groups of the third pixel data are obtained, the image processing unit 140 performs the color space transforming process for multiple groups of the third pixel data to obtain multiple groups of fourth pixel data corresponding to the third pixel data in the first color space. In the embodiment, the first color space is the RGB color space, and thus the fourth pixel data also include a red component, a green component and a blue component.

Figure 3:
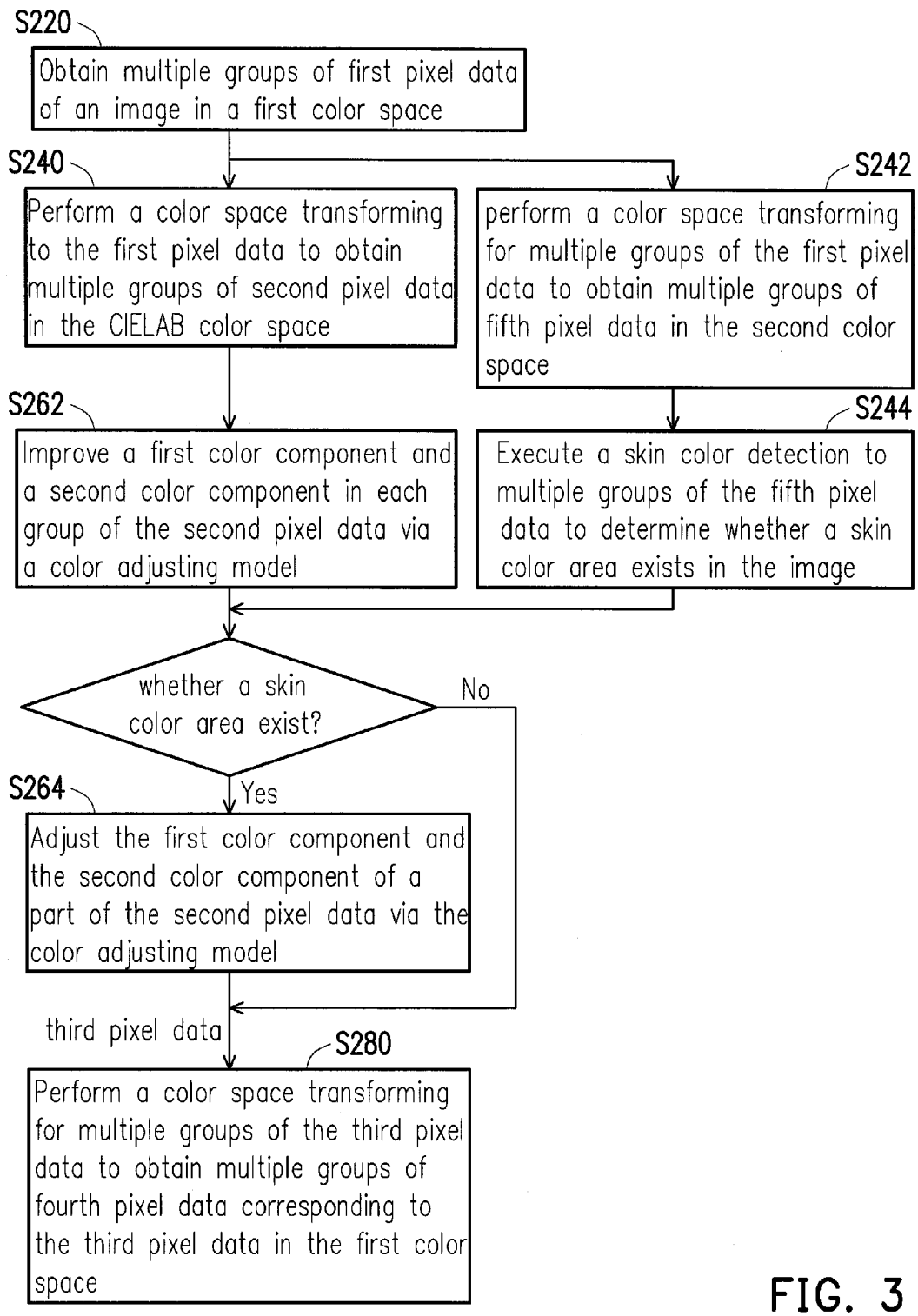
FIG. 3 is a flow chart showing an image color adjusting method in another embodiment.

FIG. 3 is a flow chart showing an image color adjusting method in another embodiment. In the embodiment, the method of adjusting the first color component a* and the second color component b* of each group of the second pixel data via the color adjusting model (formula 1) may further be divided to two parts. One is to perform a color enhancement to the second pixel data, and the other one is to perform a color adjustment to a part of the second pixel data. Please refer to FIG. 3, in the step S240, after the color space transforming process is performed for the first pixel data to obtain multiple groups of the second pixel data in the CIELAB color space, the image processing unit 140 improves the first color component a* and the second color component b* of the second pixel data via the color adjusting model (formula 1) in the step S262. The color adjusting model (formula 1) can adjust the first color component a* and the second color component b* by adjusting the control parameters t, γ and the limit parameters p, q, as the relation shown in FIG. 4, so as to improve the first color component a* and the second color component b* and further improve the color saturation of the second pixel data.

In the embodiment, not only a color enhancement is performed to the first pixel data and the second pixel data of the second pixel data, but also a color adjustment is performed for a skin color area of the image. If the skin color area exists in the image (which usually represents that a person exists in the image), after the color enhancement in the step S262, the image processing unit 140 further adjusts the first color component a* and the second color component b* of the second pixel data corresponding to the skin color area. Then, the display screen 160 can show the skin color area in the image more perfectly.

Please refer to FIG. 3, after multiple groups of the first pixel data in the first color space are obtained in the step S220, the image processing unit 140 further performs the color space transforming process for multiple groups of the first pixel data to obtain multiple groups of fifth pixel data in the second color space in the step S242. For example, the second color space may be an HSV color space, and each group of the fifth pixel data includes a hue component H, a saturation component S and a value component V. Then in step S244, a skin color detection is executed for multiple groups of the fifth pixel data to determine whether a skin color area exists in the image. Please refer to FIG. 1, the image processing unit 140 further includes a skin color detection unit 142 to detect the skin color area. Taking the HSV color space as an example, the skin color detection unit 142 sets the hue component H, the saturation component S and the value component V within an appropriate range, respectively, and compares the fifth pixel data with them to determine whether a skin color area exists in the image.

If the image does not include a skin color area, multiple groups of the third pixel data adjusted via the color adjusting model (formula 1) in the step S262 are obtained, and the image processing unit 140 obtains the fourth pixel data corresponding to the third pixel data in the first color space in the step S280. On the contrary, if the image includes a skin color area, the image processing unit 140 further adjusts the first color component a* and the second color component b* of a part of the second pixel data via the color adjusting model (formula 1) in the step S264, and a part of the second pixel data corresponds to the skin color area.

In detail, the skin color area can also be adjusted by adjusting the control parameters t, γ and the limit parameters p, q in the color adjusting model (formula 1). In the step S262 and the step S264, the settings of the control parameters t, γ and the limit parameters p, q in the color adjusting model (formula 1) are different. Compared with the color adjusting model (formula 1) used for improving the first color component a* and the second color component b* of the second pixel data in the step S262, the color adjusting model (formula 1) in the step S264 includes smaller control parameters t and to reduce the color saturation of the skin color area. Finally, after the image processing unit 140 obtains the third pixel data adjusted in the step S262 and in the step S264, the fourth pixel data corresponding to the third pixel data in the first color space are obtained in the step S280.

In sum, the pixel data of an image defined in other color spaces can be transformed to the CIELAB color space via the image color adjusting method and the electronic device using the same, and the color saturation of the image can be adjusted via the color adjusting model without an image distortion or a color supersaturation. Moreover, the image color adjusting method can be used to detect whether a skin color area exists in the image, and the skin color area can be adjusted via the same color adjusting model to make the display screen show the skin color area in the image more perfectly.

Although the present invention has been described in considerable detail with reference to certain preferred embodiments thereof, the disclosure is not for limiting the scope. Persons having ordinary skill in the art may make various modifications and changes without departing from the scope. Therefore, the scope of the appended claims should not be limited to the description of the preferred embodiments described above.

What is claimed is:

1. An image color adjusting method applied to an electronic device equips with an image processing unit and a display screen, the image color adjusting method comprising following steps:

obtaining multiple groups of first pixel data of an image in a first color space;

performing a first color space transforming process for the first pixel data to obtain multiple groups of second pixel data of the image in a CIELAB color space, wherein each of the second pixel data includes a luminance component L*, a first color component a* and a second color component b*;

adjusting the first color component a* and the second color component b* of the second pixel data to obtain multiple groups of third pixel data;

performing a second color space transforming process for the third pixel data to obtain multiple groups of fourth pixel data corresponding to the third pixel data in the first color space; and displaying the adjusted image, wherein the adjusted image including multiple groups of the fourth pixel data by the display screen, wherein a color adjusting model is used to adjust the first color component a* and the second color component b* of the second pixel data, and the color adjusting model is:

$$g(x) = p \times \frac{f(x)^t}{f(x)^\gamma + q} \quad (1)$$

wherein "x" represents the first color component a* or the second color component b*, "f(x)" is a color mapping value of the first color component a* or the second color component b* mapping to a range between "0" to "1", parameters "t" and "γ" are control parameters, parameters "p" and "q" are limit parameters, and "g(x)" is a color adjusting value which generated by adjusting the color mapping value "f(x)" via the color adjusting model.

2. The image color adjusting method according to claim 1, wherein the first color space is an RGB color space, and each of the first pixel data and each of the fourth pixel data include a red component R, a green component G and a blue component B, respectively.

3. The image color adjusting method according to claim 1, wherein 0≤γ≤4 and 0.99≤t≤1.91, and 0<p≤2 and 0<q≤1.

4. The image color adjusting method according to claim 1, wherein the step of adjusting the first color component a* and the second color component b* of the second pixel data includes:

increasing the first color component a* and the second color component b* of the second pixel data to improve a color saturation of the second pixel data.

5. The image color adjusting method according to claim 4, wherein the image color adjusting method further includes:

performing a third color space transforming process to the first pixel data to obtain multiple groups of the fifth pixel data of the image in a second color space; and executing a skin color detection to the fifth pixel data to determine whether a skin color area exists in the image;

wherein if the image includes the skin color area, the first color component a* and the second color component b* of a part of the second pixel data are adjusted after the color saturation of the second pixel data is improved, and a part of the second pixel data corresponds to the skin color area in the image.

6. The image color adjusting method according to claim 5, wherein the second color space is a HSV color space, and each of the fifth pixel data includes a hue component H, a saturation component S and a value component V.

7. An electronic device including an image processing function, the electronic device comprising:

an image receiving unit receiving an image and obtaining multiple groups of first pixel data of the image in a first color space;

an image processing unit coupled to the image receiving unit and performing a first color space transforming process for the first pixel data to obtain multiple groups of second pixel data of the image in a CIELAB color space, wherein each of the second pixel data includes a luminance component L*, a first color component a* and a second color component b*, the image processing unit applies a color adjusting model to adjust the first color component a* and the second color component b* of the second pixel data to obtain multiple groups of third pixel data, and the image processing unit performs a second color space transforming process for the third pixel data to obtain multiple groups of fourth pixel data corresponding to the third pixel data in the first color space; and a display screen coupled to the image processing unit to receive and display the adjusted image including multiple groups of the fourth pixel data, wherein the color adjusting model is:

$$g(x) = p \times \frac{f(x)^t}{f(x)^\gamma + q} \quad (1)$$

wherein "x" represents the first color component a* or the second color component b*, "f(x)" is a color mapping value of the first color component a* or the second color component b* mapping to a range between "0" to "1", parameters "t" and "γ" are control parameters, parameters "p" and "q" are limit parameters, and "g(x)" is a color adjusting value which generated by adjusting the color mapping value "f(x)" via the color adjusting model.

8. The electronic device according to claim 7, wherein the first color space is an RGB color space, and each of the first pixel data and each of the fourth pixel data include a red component R, a green component G and a blue component B, respectively.

9. The electronic device according to claim 7, wherein 0≤γ≤4 and 0.99≤t≤1.91, and 0<p≤2 and 0<q≤1.

10. The electronic device according to claim 7, wherein the color adjusting model increases the first color component a* and the second color component b* of the second pixel data to improve a color saturation of the second pixel data in the image processing unit.

11. The electronic device according to claim 10, wherein the image processing unit further includes a skin color detection unit, the image processing unit performs a third color space transforming process for the first pixel data to obtain multiple groups of the fifth pixel data of the image in a second color space, and the skin color detection unit executes a skin color detection for the fifth pixel data to determine whether a skin color area exists in the image.

12. The electronic device according to claim 11, wherein the second color space is a HSV color space, and each of the fifth pixel data includes a hue component H, a saturation component S and a value component V.

* * * * *